(12) United States Patent
Jeong et al.

(10) Patent No.: US 11,519,660 B2
(45) Date of Patent: Dec. 6, 2022

(54) REFRIGERATOR AND METHOD OF CONTROLLING THEREOF

(71) Applicant: Samsung Electronics Co., Ltd., Suwon-si (KR)

(72) Inventors: Wookjin Jeong, Suwon-si (KR); Sihyun Park, Suwon-si (KR); Gyuchang Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 253 days.

(21) Appl. No.: 16/994,490

(22) Filed: Aug. 14, 2020

(65) Prior Publication Data
US 2021/0131718 A1    May 6, 2021

(30) Foreign Application Priority Data
Nov. 1, 2019    (KR) .......................... 10-2019-0138963

(51) Int. Cl.
*F25D 19/00*    (2006.01)
*F25D 27/00*    (2006.01)
*F25D 11/02*    (2006.01)

(52) U.S. Cl.
CPC .............. *F25D 19/00* (2013.01); *F25D 11/02* (2013.01); *F25D 27/00* (2013.01); *F25D 2700/16* (2013.01)

(58) Field of Classification Search
CPC .... F25D 2400/361; F25D 29/00; H04N 7/183
See application file for complete search history.

(56) References Cited

U.S. PATENT DOCUMENTS

| | | | |
|---|---|---|---|
| 9,920,979 B2 * | 3/2018 | Kang | H04N 7/183 |
| 10,378,812 B2 * | 8/2019 | Kim | F25D 23/068 |
| 11,262,962 B2 * | 3/2022 | Park | G06F 3/14 |
| 2002/0011072 A1 * | 1/2002 | Hiraoka | F25D 11/02 62/126 |
| 2006/0096303 A1 * | 5/2006 | Kavounas | F25D 29/00 62/331 |
| 2016/0076805 A1 * | 3/2016 | Park | F25D 21/002 62/151 |
| 2019/0182345 A1 * | 6/2019 | Ji | H04L 67/55 |
| 2019/0368805 A1 * | 12/2019 | Lim | F25D 23/028 |

FOREIGN PATENT DOCUMENTS

| | | | |
|---|---|---|---|
| JP | 2018-179405 A | 11/2018 | |
| KR | 10-0430296 B1 | 5/2004 | |
| KR | 10-0469202 B1 | 1/2005 | |
| KR | 10-1678436 B1 | 12/2016 | |
| WO | WO-2009138359 A2 * | 11/2009 | A47L 15/4293 |

* cited by examiner

*Primary Examiner* — Filip Zec

(57) ABSTRACT

A refrigerator is provided. The refrigerator includes a camera, a thermal imaging camera, a display, and a processor configured to acquire an image that photographed the inside of the refrigerator through the camera, identify an object included in the acquired image, acquire information on the temperature of the identified object based on a thermal image that photographed the inside of the refrigerator through the thermal imaging camera, and control the display to display information on the identified object and information on the temperature of the identified object.

10 Claims, 15 Drawing Sheets

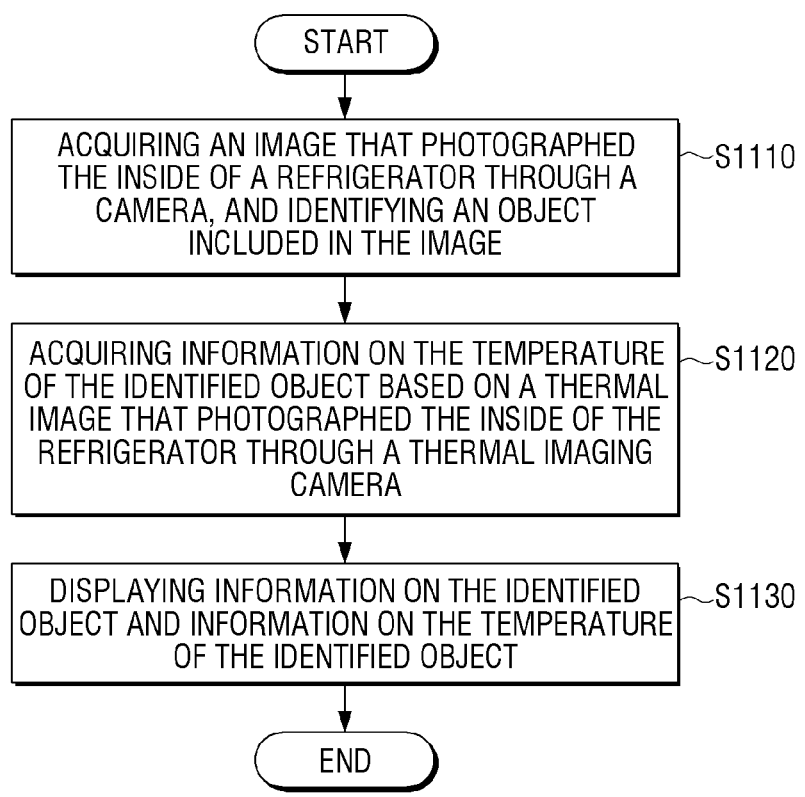

REFRIGERATOR AND METHOD OF CONTROLLING THEREOF

CROSS-REFERENCE TO RELATED APPLICATION

This application is based on and claims priority under 35 U.S.C. § 119(a) of a Korean patent application number 10-2019-0138963, filed on Nov. 1, 2019 in the Korean Intellectual Property Office, the disclosure of which is incorporated by reference herein in its entirety.

BACKGROUND

1. Field

The disclosure relates to a refrigerator and a method of controlling thereof, and more particularly, to a refrigerator that is capable of providing information on food kept in the refrigerator, and a method of controlling thereof.

2. Description of Related Art

A refrigerator is an electronic apparatus (or, a home appliance) that keeps food refrigerated or frozen. A refrigerator may not only keep food but also medicines, alcoholic liquors, or cosmetics, etc.

As technologies are gradually developed, refrigerators including displays are being developed.

In this regard, there is a need for a search of a method for providing various kinds of information for goods kept inside a refrigerator through a display.

SUMMARY

A refrigerator according to an embodiment of the disclosure includes a camera, a thermal imaging camera, a display, and a processor configured to acquire an image that photographed the inside of the refrigerator through the camera, identify an object included in the acquired image, acquire information on the temperature of the identified object based on a thermal image that photographed the inside of the refrigerator through the thermal imaging camera, and control the display to display information on the identified object and information on the temperature of the identified object.

Meanwhile, a method of controlling a refrigerator according to an embodiment of the disclosure may include the steps of acquiring an image that photographed the inside of the refrigerator through the camera, and identifying an object included in the acquired image, acquiring information on the temperature of the identified object based on a thermal image that photographed the inside of the refrigerator through the thermal imaging camera, and displaying information on the identified object and information on the temperature of the identified object.

BRIEF DESCRIPTION OF THE DRAWINGS

FIG. 11 is a flow chart for illustrating a method of controlling a refrigerator according to an embodiment of the disclosure.

DETAILED DESCRIPTION

Figure 1A:
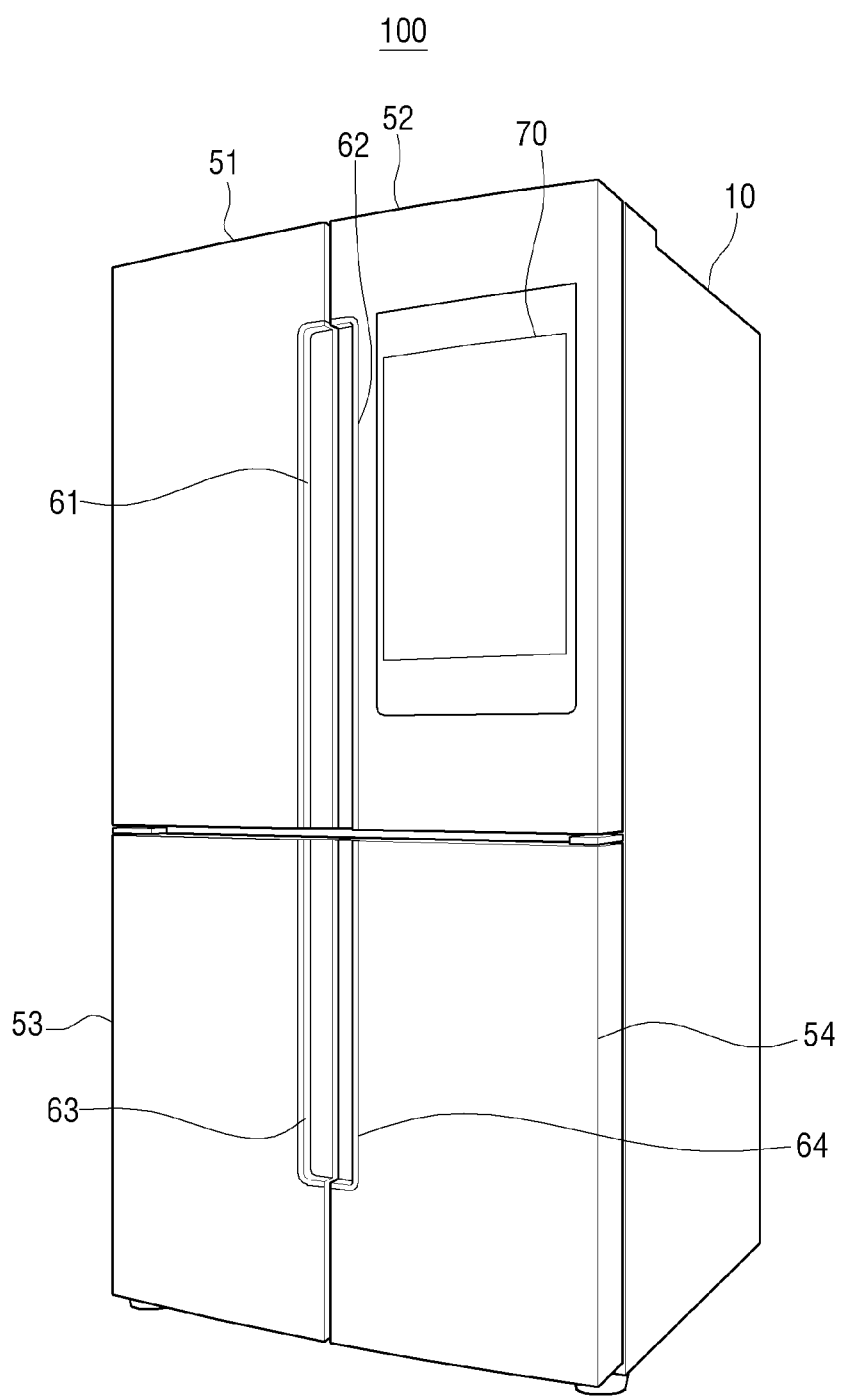
FIG. 1A is a schematic perspective view illustrating a refrigerator according to an embodiment of the disclosure.

The disclosure was devised according to the aforementioned need, and the purpose of the disclosure is in providing a refrigerator that is capable of providing information on an object kept inside the refrigerator and the temperature of the object, and a method of controlling thereof.

Hereinafter, various embodiments of the disclosure will be described with reference to the accompanying drawings. Meanwhile, it should be noted that the various embodiments are not for limiting the technology described in the disclosure to a specific embodiment, but they should be interpreted to include various modifications, equivalents, and/or alternatives of the embodiments of the disclosure. Also, with respect to the detailed description of the drawings, similar components may be designated by similar reference numerals.

In the disclosure, terms such as "have," "may have," "include," and "may include" should be construed as denoting that there are such characteristics (e.g.: elements such as numerical values, functions, operations, and components), and the terms are not intended to exclude the existence of additional characteristics.

Also, in the disclosure, the expressions "A or B," "at least one of A and/or B," or "one or more of A and/or B" and the like may include all possible combinations of the listed items. For example, "A or B," "at least one of A and B," or "at least one of A or B" refer to all of the following cases: (1) including at least one A, (2) including at least one B, or (3) including at least one A and at least one B.

In addition, the expressions "first," "second" and the like used in the disclosure may be used to describe various elements regardless of any order and/or degree of importance. Also, such expressions are used only to distinguish one element from another element, and are not intended to limit the elements.

Meanwhile, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element). In contrast, the description that one element (e.g.: a first element) is "directly coupled" or "directly connected" to another element (e.g.: a second element) can be interpreted to mean that still another element (e.g.: a third element) does not exist between the one element and the another element.

Also, the expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily mean that a device is "specifically designed to" in terms of hardware. Instead, under some circumstances, the expression "a device configured to" may mean that the device "is capable of" performing an operation together with another device or component. For example, the phrase "a processor configured to perform A, B, and C" may mean a dedicated processor (e.g.: an embedded processor) for performing the corresponding operations, or a generic-purpose processor (e.g.: a CPU or an application processor) that can perform the corresponding operations by executing one or more software programs stored in a memory device.

Figure 1B:
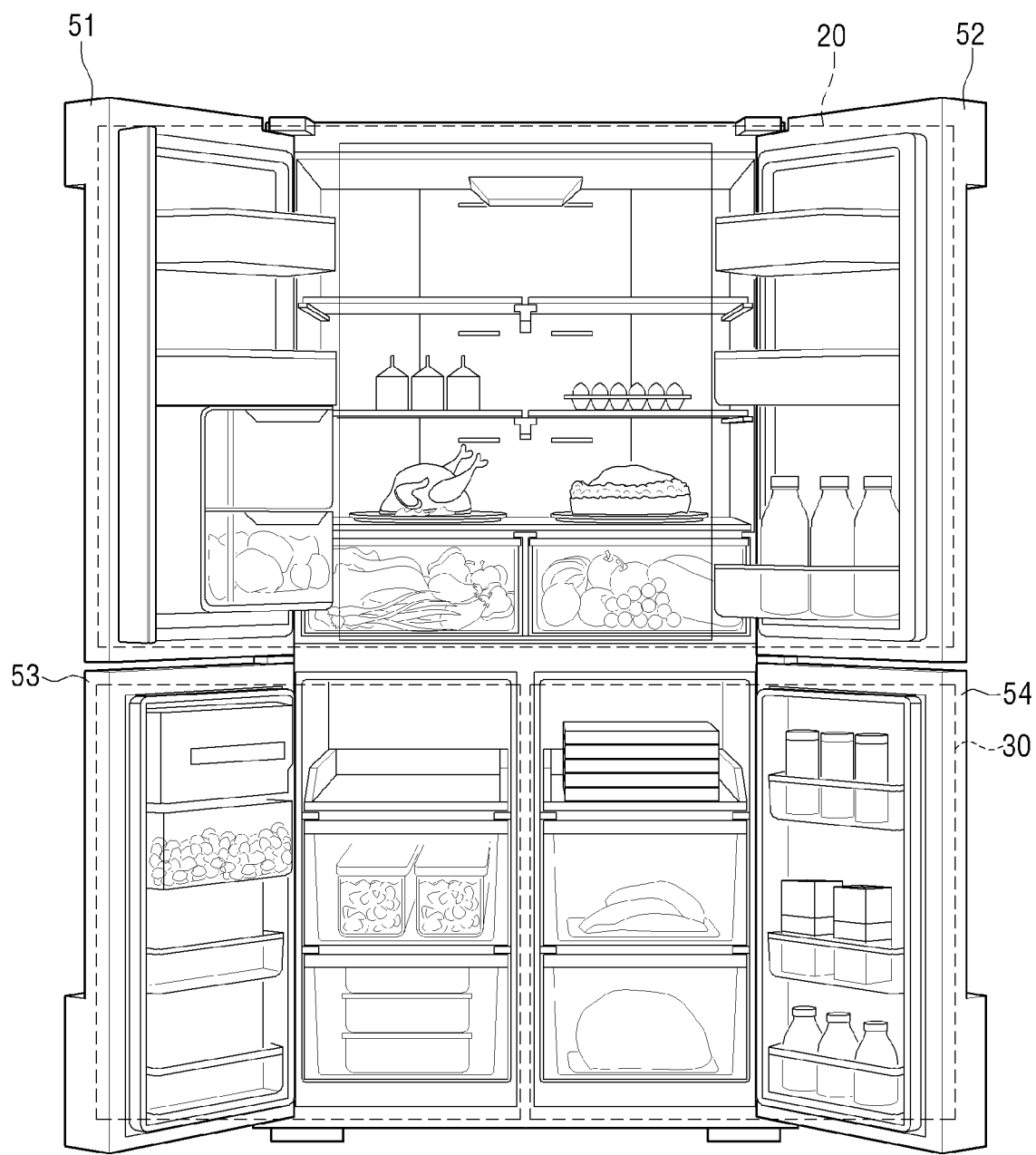
FIG. 1B is a diagram illustrating a refrigerator of which door is opened according to an embodiment of the disclosure.

FIG. 1A is a schematic perspective view illustrating a refrigerator according to an embodiment of the disclosure, and FIG. 1B is a diagram illustrating a refrigerator of which door is opened according to an embodiment of the disclosure.

Referring to FIG. 1A and FIG. 1B, the refrigerator 100 may include a main body 10. Here, the main body 10 may include an inner case (not shown) forming storage chambers 20, 30, an outer case (not shown) forming the exterior of the refrigerator 100, and an insulator (not shown) maintaining the difference of temperatures between the inner case and the outer case. In this case, the insulator (not shown) may prevent leakage of cold air inside the storage chambers 20, 30 to the outside, and prevent introduction of warm air outside into the insides of the storage chambers 20, 30.

Also, inside the main body 10, storage chambers 20, 30 for storing and keeping food, etc. may be formed. In this case, the storage chambers 20, 30 may be divided into a plurality of spaces by shelves, etc.

Meanwhile, the storage chambers 20, 30 may be divided by a barrier 40. Specifically, the barrier 40 may divide the storage chambers 20, 30 inside the main body 10 into an upper chamber and a lower chamber. In this case, the storage chamber 20 located on the upper side of the main body 10 may be a refrigerating storage 20 (hereinafter, referred to as "a refrigerating compartment"), and the storage chamber 30 located on the lower side of the main body 10 may be a freezing storage 30 (hereinafter, referred to as "a freezing compartment").

Meanwhile, on the front surface of the main body 10, doors 51 to 54 may be provided. Specifically, the first door 51 may be provided on one side (e.g., the left side) of the refrigerating compartment 20, the second door 52 may be provided on the other side (e.g., the right side) of the refrigerating compartment 20, the third door 53 may be provided on one side (e.g., the left side) of the freezing compartment 30, and the fourth door 54 may be provided on the other side (e.g., the right side) of the freezing compartment 30.

In this case, the doors 51 to 54 are provided to be rotatable, and may open and close the opened front surface of the main body 10. For this, the doors 51 to 54 may be hinge-coupled to both sides of the main body 10 such that they are respectively rotatable in both side directions. That is, the doors 51, 52 may be constituted to be able to open and close the refrigerating compartment 20, and the doors 53, 54 may be constituted to be able to open and close the freezing compartment 30.

Also, on the doors 51 to 54, doorknobs 61 to 64 may be provided. Accordingly, a user may open or close the doors 51 to 54 through the doorknobs 61 to 64.

Meanwhile, the refrigerator 100 may include a plurality of cameras (not shown) for photographing the inside. Specifically, the refrigerator 100 may include a camera (not shown) photographing images and a thermal imaging camera (not shown) that detects infrared rays emitted from an object and visualizes the temperature (or, distribution of temperatures) of the object.

Accordingly, the refrigerator 100 may respectively photograph the insides of the refrigerating compartment 20 and the freezing compartment 30 and generate images by using the camera (not shown), and by using the thermal imaging camera (not shown), the refrigerator 100 may respectively photograph the insides of the refrigerating compartment 20 and the freezing compartment 30 and generate thermal images expressing the temperatures (e.g., surface temperatures) of objects such as food, groceries, etc. kept inside the refrigerating compartment 20 and the freezing compartment 30.

Meanwhile, on the front surface of the refrigerator 100 (e.g., the front surface of the second door 52), a display 70 may be provided. In this case, the display 70 may display the names and temperatures of objects kept in the refrigerating compartment 20 and the freezing compartment 30.

In this case, the display 70 may be implemented as a touch screen, and receive inputs of various user commands. However, this is merely an example, and the refrigerator 100 may receive inputs of user commands by including a separate physical button.

Meanwhile, in the aforementioned embodiment, it was described that the refrigerating compartment 20 is provided on the upper side of the main body 10 and the freezing compartment 30 is provided on the lower side of the main body 10, but this is merely an example. Depending on embodiments, the refrigerating compartment may be provided on the left side of the main body 10, and the freezing compartment may be provided on the right side of the main body 10. In this case, doors may be respectively provided on the left and right sides of the main body 10, and one door may be constituted to open and close the refrigerating compartment, and the other door may be constituted to open and close the freezing compartment.

Figure 2:
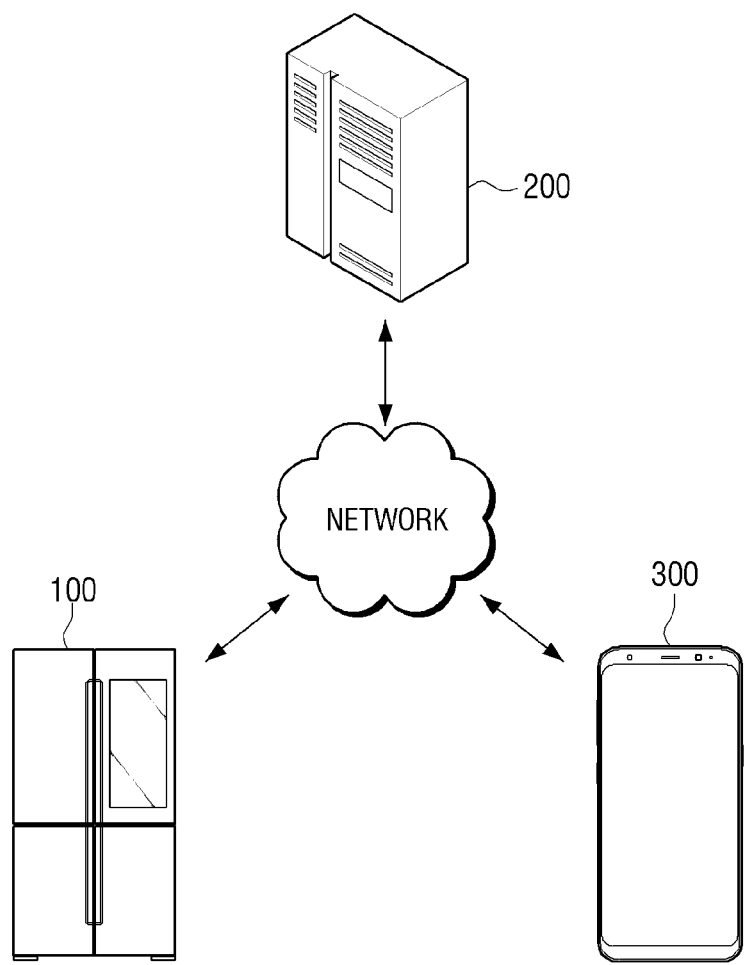
FIG. 2 is a diagram for illustrating an example of a system according to an embodiment of the disclosure.

Meanwhile, the refrigerator 100 according to an embodiment of the disclosure may communicate with a server 200 through a network as in FIG. 2. In this case, the refrigerator 100 may transmit an image that photographed the inside and temperatures of objects (i.e., food, groceries, etc.) kept inside the refrigerator 100 and the like to the server 200.

The server 200 may communicate with an electronic apparatus 300 through a network. In this case, the server 200 may transmit various kinds of data received from the refrigerator 100 to the electronic apparatus 300. Also, the server 200 may receive a control command from the electronic apparatus 300, and transmit the control command received from the electronic apparatus 300 to the refrigerator 100.

In this case, the refrigerator 100 may perform various operations according to control commands received from the server 200, and detailed content in this regard will be described later.

Figure 3A:
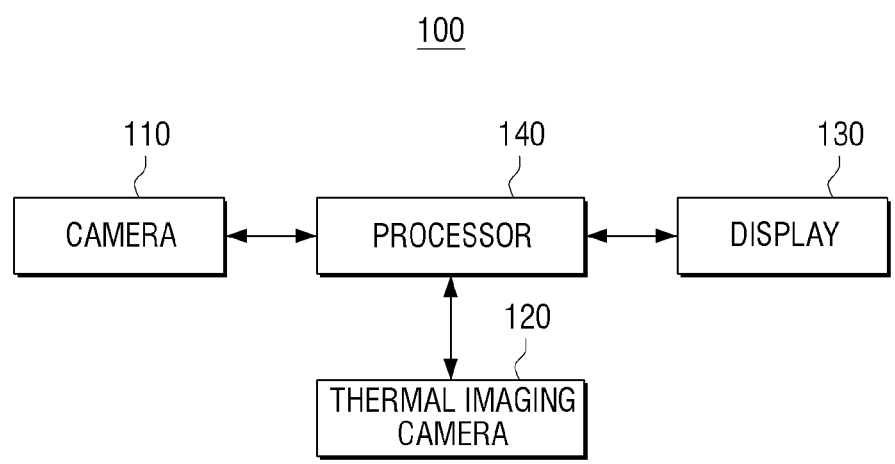
FIG. 3A is a block diagram for illustrating the constitution of a refrigerator according to an embodiment of the disclosure.

FIG. 3A is a block diagram for illustrating the constitution of a refrigerator according to an embodiment of the disclosure.

Referring to FIG. 3A, the refrigerator 100 may include a camera 110, a thermal imaging camera 120, a display 130, and a processor 140.

The camera 110 may generate an image. In this case, the camera 110 is provided inside the refrigerator 100, and may photograph the inside of the refrigerator 100, and generate an image of the inside of the refrigerator 100.

The thermal imaging camera 120 may generate a thermal image. Specifically, the thermal imaging camera 120 may detect infrared rays emitted from an object, and generate a thermal image which is imagification of the temperature (or, distribution of temperatures) of the object by using the detected infrared rays. In this case, the thermal imaging camera 120 is provided inside the refrigerator 100, and may photograph the inside of the refrigerator 100, and generate a thermal image of the inside of the refrigerator 100.

The display 130 may display various screens. In this case, the display 130 may be implemented as displays in various forms such as a liquid crystal display (LCD), etc.

Also, the display 130 may be combined with a touch panel (not shown) and implemented as a touch screen. In this case, the touch screen may not only perform a display function but also detect the location of a touch input, the touched area, and also the pressure of the touch input.

The processor 140 may control the overall operations of the refrigerator 100. Specifically, the processor 140 may be electronically connected with the camera 110, the thermal imaging camera 120, and the display 130, and control the overall operations and functions of the refrigerator 100.

According to an embodiment of the disclosure, the processor 140 may include one or more of a central processing unit (CPU), a micro controller unit (MCU), a micro processing unit (MPU), a controller, a graphics processing unit (GPU), an artificial intelligence (AI) processor, a neural processing unit (NPU), or an application processor (AP).

Meanwhile, functions related to artificial intelligence according to the disclosure may be operated through the processor 140 and a memory (not shown).

The processor 140 may consist of one or a plurality of processors. Here, the one or plurality of processors may be generic-purpose processors such as a CPU, an AP, a digital signal processor (DSP), etc., graphics-dedicated processors such as a GPU and a vision processing unit (VPU), or artificial intelligence-dedicated processors such as an NPU. The one or plurality of processors may perform control such that input data is processed according to pre-defined operation rules or an artificial intelligence model stored in the memory. Alternatively, in case the one or plurality of processors are artificial intelligence-dedicated processors, the artificial intelligence-dedicated processors may be designed as a hardware structure specified for processing of a specific artificial intelligence model.

Meanwhile, predefined operation rules or an artificial intelligence model are characterized in that they are made through learning. Here, being made through learning means that a basic artificial intelligence model is trained by using a plurality of learning data by a learning algorithm, and predefined operation rules or an artificial intelligence model set to perform a desired characteristic (or, purpose) are made. Such learning may be performed in an apparatus wherein artificial intelligence is performed itself according to the disclosure, or performed through a separate server and/or system. As examples of learning algorithms, there are supervised learning, unsupervised learning, semi-supervised learning, or reinforcement learning, but learning algorithms are not limited to the aforementioned examples.

First, the processor 140 may acquire (or, obtain) an image that photographed the inside of the refrigerator 100 through the camera 110, and identify objects included in the acquired image.

Specifically, the processor 140 may photograph the inside of the refrigerator 100 through the camera 110, input the photographed image into an artificial intelligence model, and thereby identify objects.

In this case, the artificial intelligence model may be an artificial intelligence model trained to identify objects. That is, when an image is input, the artificial intelligence model may identify objects included in the image, and output information on the identified objects, for example, the names, kinds, etc. of the objects.

Meanwhile, the artificial intelligence model may consist of a plurality of neural network layers. Each of the plurality of neural network layers has a plurality of weight values, and performs an operation of the neural network layer through an operation between the operation result of the previous layer and the plurality of weight values. The plurality of weight values included by the plurality of neural network layers may be optimized by the learning result of the artificial intelligence model. For example, the plurality of weight values may be updated such that a loss value or a cost value acquired at the artificial intelligence model during a learning process is reduced or minimized.

Meanwhile, an artificial neural network may include a deep neural network (DNN), and for example, there are a convolutional neural network (CNN), a recurrent neural network (RNN), a restricted Boltzmann machine (RBM), a deep belief network (DBN), a bidirectional recurrent deep neural network (BRDNN), or deep Q-networks, etc., but the disclosure is not limited to the aforementioned examples.

Accordingly, the processor 140 may determine objects kept in the refrigerator 100 based on information output from the artificial intelligence model.

Figure 4:
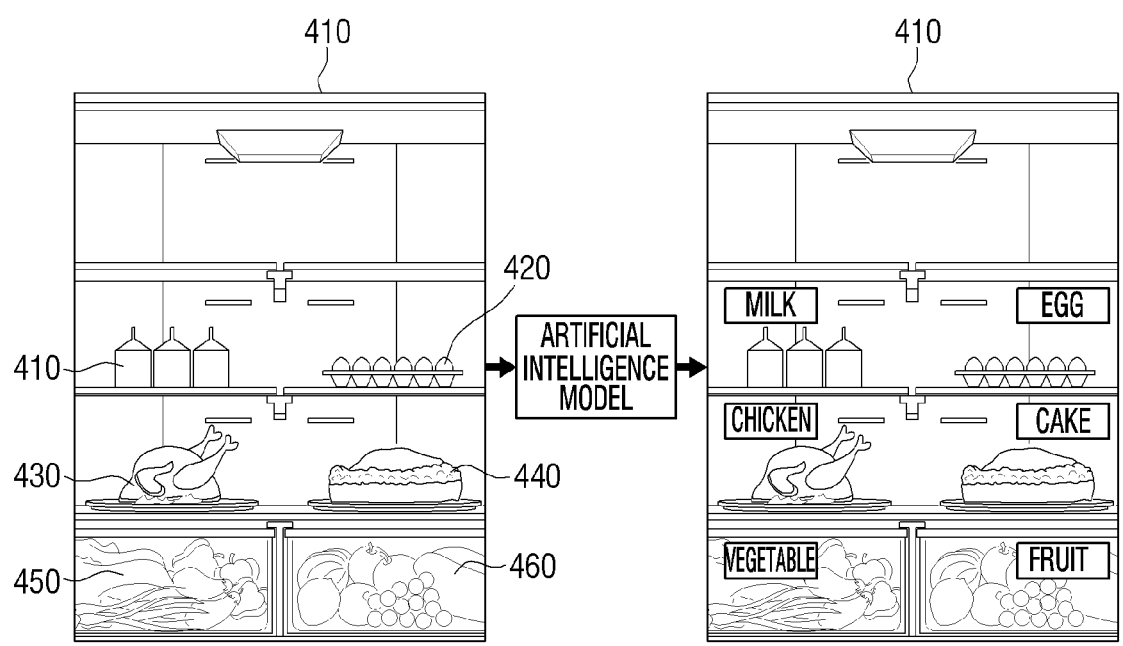
FIG. 4 is a diagram for illustrating a method of identifying an object by using an artificial intelligence model according to an embodiment of the disclosure.

For example, as in FIG. 4, the processor 140 may photograph the inside of the refrigerating compartment 20 by using the camera 110, and input the photographed image 410 into the artificial intelligence model.

In this case, the artificial intelligence model may identify a plurality of objects 410 to 460 included in the image 410, and output information such as the names, kinds, etc. of each object.

Accordingly, the processor 140 may determine the names, kinds, etc. of the objects kept inside the refrigerating compartment 20 based on the information output from the artificial intelligence model.

For example, the processor 140 may determine that the first object 410 kept inside the refrigerating compartment 20 is milk, the second object 420 is an egg, the third object 430 is chicken, the fourth object 440 is cake, the fifth object 450 is vegetable, and the sixth object 460 is fruit, based on the information output from the artificial intelligence model.

Meanwhile, according to an embodiment of the disclosure, the artificial intelligence model may be stored in the memory of the refrigerator 100. However, depending on embodiments, the artificial intelligence model may be stored in a separate server, and the processor 140 may transmit an image acquired through the camera 110 to the server, and receive information on objects included in the image from the server, and thereby identify the objects.

Meanwhile, in FIG. 4, it was described that the inside of the refrigerating compartment 20 is photographed through the camera 110, but in addition to it, the camera 110 may be constituted to photograph the shelves of the doors 61, 62 inside the refrigerating room 20, the inside of the freezing compartment 30, the shelves of the doors 63, 64 inside the freezing compartment 30, etc., and the processor 140 may input such images into the artificial intelligence model, and thereby identify objects kept inside the refrigerator 100.

Meanwhile, the processor 140 may acquire information on the temperatures of objects based on a thermal image that photographed the inside of the refrigerator 100 through the thermal imaging camera 120.

Specifically, the processor 140 may photograph the inside of the refrigerator 100 through the thermal imaging camera 120 and acquire a thermal image for the inside of the refrigerator 100.

Figure 5:
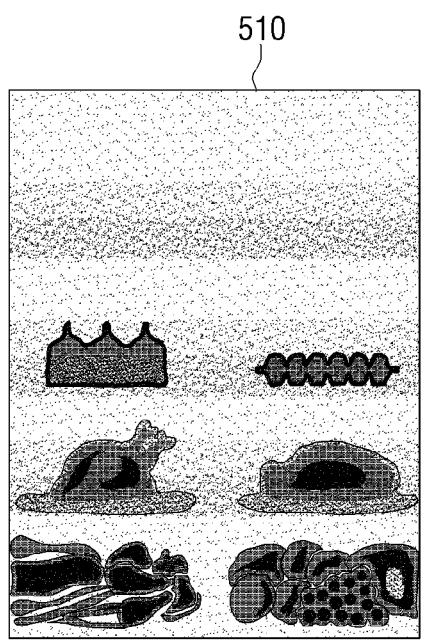
FIG. 5 is a diagram illustrating a thermal image according to an embodiment of the disclosure.

In this case, the thermal image may be an image indicating the temperatures of objects kept inside the refrigerator 100. For example, a thermal image 510 that photographed the inside of the refrigerator 100 through the thermal imaging camera 120 may be illustrated as in FIG. 5. In this case, in the thermal image, objects may be expressed in a red color as their temperatures are higher, and expressed in a dark violet color as their temperatures are lower.

Accordingly, the processor 140 may acquire information on the temperatures of objects kept inside the refrigerator 100 based on the thermal image.

Also, the processor 140 may determine the temperatures of objects kept inside the refrigerator 100 based on the thermal image.

For example, the processor 140 may determine the temperature expressed by the widest area in an object as the temperature of the object by using the thermal image of the object. As another example, the processor 140 may determine the temperature of an object by adding a weight value for each temperature according to the sizes of areas for each temperature in the object by using the thermal image of the object.

Meanwhile, the processor 140 may control the display 130 to display information on an object and information on the temperature of the object. In this case, the display 130 may be provided on the front surface of the refrigerator 100, as illustrated in FIG. 1A. Accordingly, a user may figure out what kinds of food, groceries, etc. are kept in the refrigerator 100 and what the temperatures of the products are without opening the door of the refrigerator 100.

Specifically, the processor 140 displays an image acquired through the camera 110 on the display 130, and here, the processor 140 may display the name and temperature of an object on the image.

In this case, in displaying the temperature of the object, the processor 140 may display the area corresponding to the object in the thermal image acquired through the thermal imaging camera 120 by overlapping the area to the area corresponding to the object in the image acquired through the camera 110.

That is, the processor 140 may overlap the area including the object in the thermal image on the area including the object in the image photographed through the camera 110, and display the image on which the thermal image is overlapped on the display 130. In this case, the processor 140 may increase the transparency of the area including the object in the thermal image, and overlap the area on the area including the object in the image.

Figure 6A:
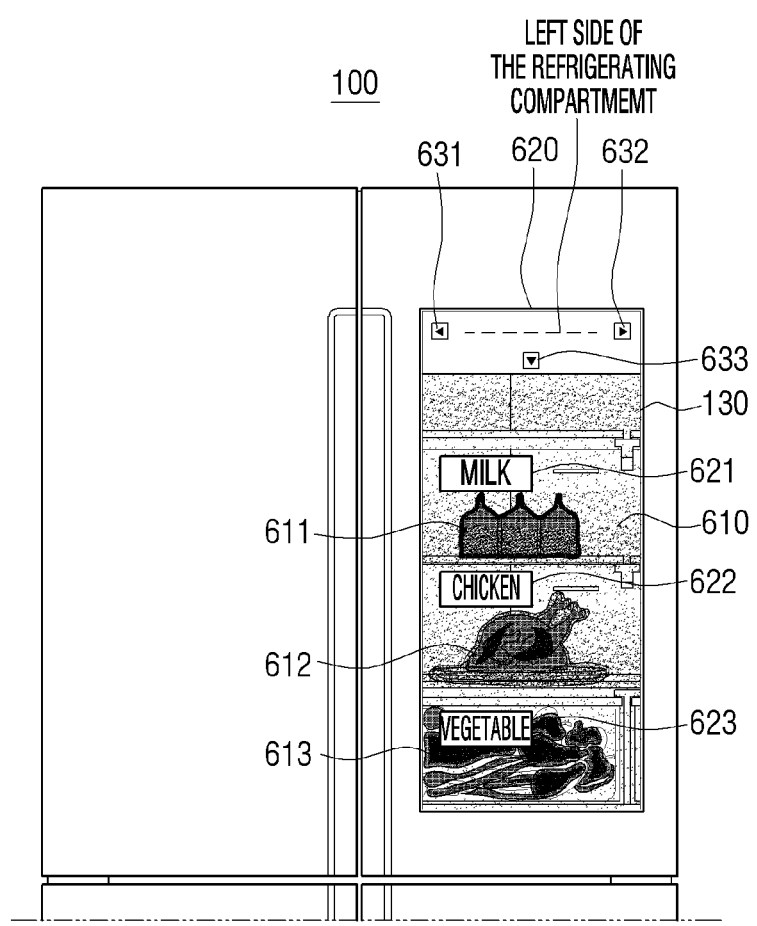
FIG. 6A is a diagram for illustrating a method of displaying an image that photographed the inside of a refrigerator according to an embodiment of the disclosure.

For example, as in FIG. 6A, the processor 140 may display the image 610 in the left side space of the refrigerating compartment 20 photographed through the camera 110 on the display 130. Here, the processor 140 may crop the areas of each of a plurality of objects in the thermal image in the left side space of the refrigerating compartment 20 photographed through the thermal imaging camera 120, and overlap the thermal images of each object on each of the plurality of objects included in the image 610.

Accordingly, with respect to the objects included in the image, an image which was generated as the thermal images of the objects were overlapped may be displayed on the display 130.

For example, as in FIG. 6A, in the image 610, a thermal image for milk may be overlapped on the milk 611, and in the image 610, a thermal image for chicken may be overlapped on the chicken 612, and in the image 610, a thermal image for vegetable may be overlapped on the vegetable 613.

Also, the processor 140 may display the names of the objects on the image. That is, the processor 140 may display the names of the objects acquired through the artificial intelligence model on the image.

For example, as in FIG. 6A, the processor 140 may display "milk" 621 around the area wherein milk is included in the image 610, display "chicken" 622 around the area wherein chicken is included in the image 610, and display "vegetable" 623 around the area wherein vegetable is included in the image 610.

Also, the processor 140 may display a user interface indicating a space in which location of the refrigerator 100 the image displayed on the display 130 photographed and a user interface for receiving input of a user command indicating an image that photographed a space in another location on the display 130.

For example, as in FIG. 6A, the processor 140 may display a user interface 620 indicating that the image displayed on the display 130 is an image that photographed the left side space of the refrigerating compartment 20. Also, the processor 140 may display user interfaces 631 to 633 in the shape of direction keys, and receive input of a user command for displaying an image that photographed another space.

In this case, if a user command for displaying the image that photographed another space is received through a user interface, the processor 140 may display the image that photographed the space corresponding to the user command on the display 130. In this case, with respect to each of the plurality of objects included in the image, the processor 140 may overlap the thermal images of each object and display the image, and display the names of each object on the image.

Figure 6B:
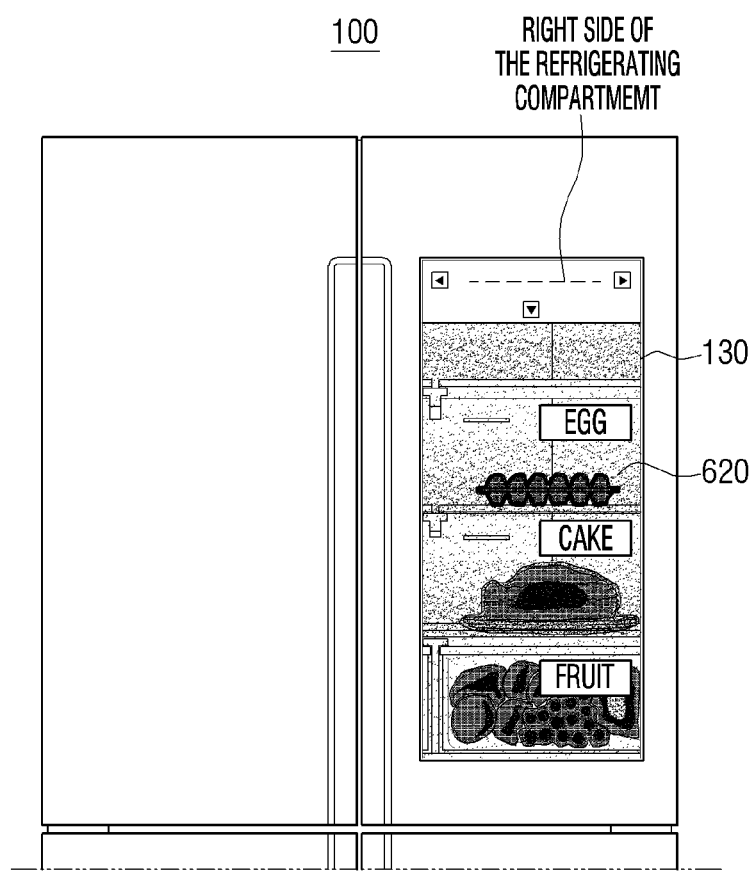
FIG. 6B is a diagram for illustrating a method of displaying an image that photographed the inside of a refrigerator according to an embodiment of the disclosure.

For example, as in FIG. 6A, if a user command selecting the user interface 632 in the shape of a direction key in the right side direction is received, the processor 140 may display the image 620 that photographed the right side space of the refrigerating compartment 20 as in FIG. 6B, and overlap the thermal images of an egg, cake, and fruit on each of the egg, cake, and fruit included in the image 620 and display the image, and display the names of each object "egg," cake," and "fruit" on the image.

Meanwhile, in the aforementioned embodiment, it was described that an image that photographed the right side space of the refrigerating compartment 20 is displayed, but this is merely an example, and the processor 140 may display an image that photographed the shelves of the doors 61, 62 inside the refrigerating compartment 20, the inside of the freezing compartment 30, the shelves of the doors 63, 64 inside the freezing compartment 30, etc. together with the thermal image according to a user command input through a user interface.

Figure 6C:
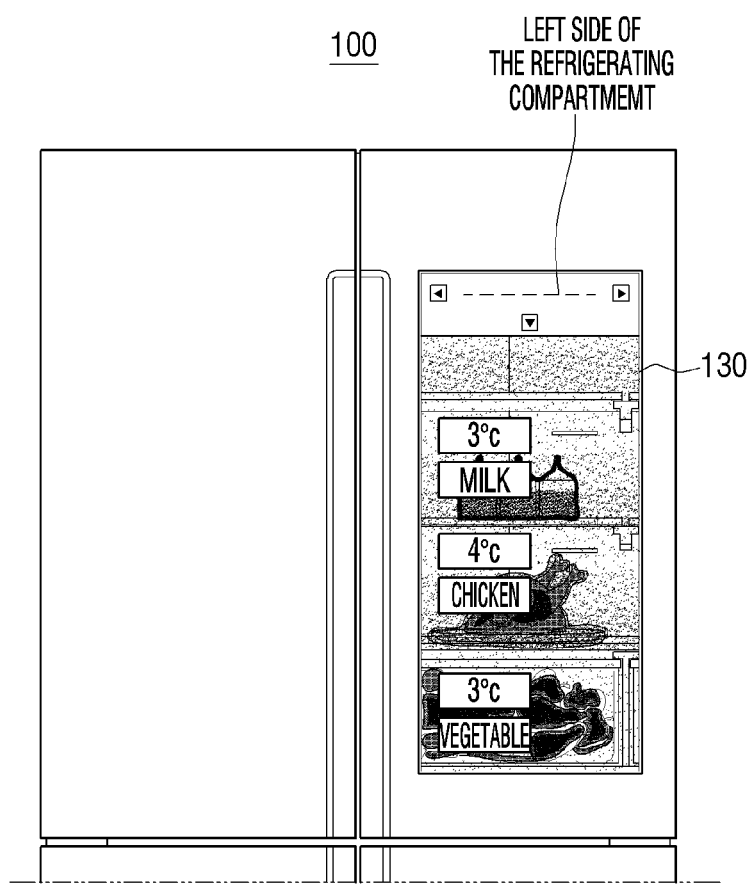
FIG. 6C is a diagram for illustrating a method of displaying an image that photographed the inside of a refrigerator according to an embodiment of the disclosure.

Meanwhile, in the aforementioned embodiment, it was described that a thermal image of an object is overlapped on the object included in an image, but this is merely an example, and the processor 140 may display the temperature of an object on an image as in FIG. 6C.

As described above, according to an embodiment of the disclosure, the refrigerator 100 may display thermal images and names for food, groceries, etc. on an image that photographed the inside. Accordingly, a user can figure out the kinds, locations, and temperatures of food, groceries, etc. kept inside a refrigerator just at a glance without opening the door, and accordingly, unnecessary leakage of cold air that is generated by opening of the door can be prevented.

Meanwhile, the processor 140 may identify an object which becomes a subject of concentration cooling (or, rapid cooling) among a plurality of objects kept in the refrigerator 100.

In this case, an object which becomes a subject of concentration cooling may be set according to a user command.

Figure 7:
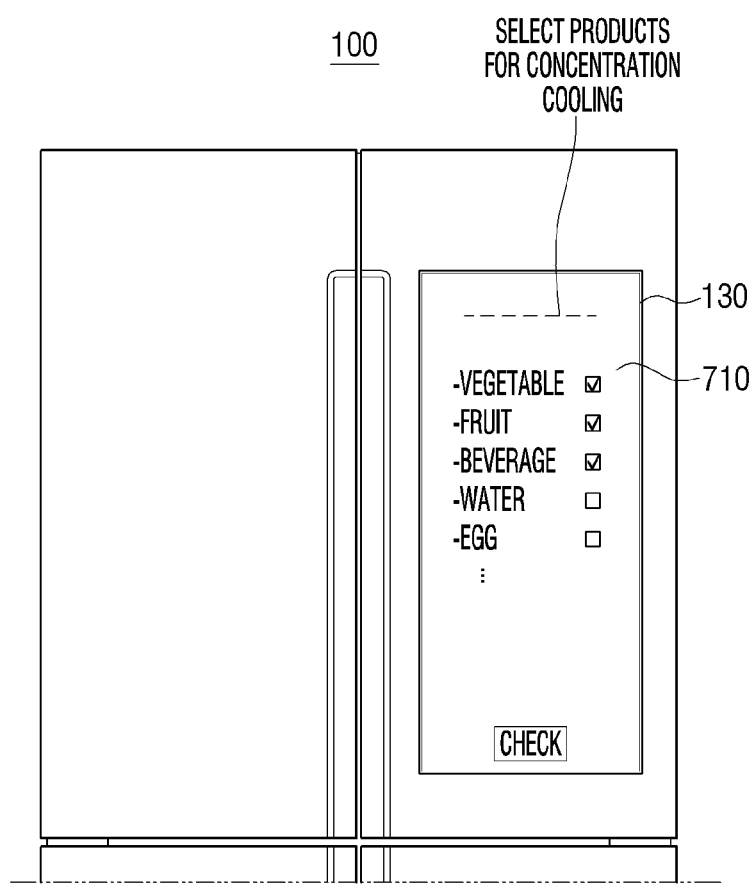
FIG. 7 is a diagram for illustrating a method of receiving input of a user command for setting a subject of concentration cooling according to an embodiment of the disclosure.

For example, as in FIG. 7, the processor 140 may display a user interface 710 including names of a plurality of objects on the display 130. Then, the processor 140 may set an object selected on the user interface according to a user command as an object that becomes a subject of concentration cooling, and store information on the set object in the memory (not shown) of the refrigerator 100.

As another example, a user interface may be displayed on the electronic apparatus 300, and the electronic apparatus 300 may transmit information on an object selected on the user interface according to a user command to the refrigerator 100 through the server 200. In this case, the processor 140 may set an object which becomes a subject of concentration cooling based on the information received from the server 200, and store information on the set object in the memory (not shown) of the refrigerator 100.

Then, the processor 140 may identify whether an object which becomes a subject of concentration cooling exists among the objects included in the image inside the refrigerator 100 photographed at the camera 110, based on information on objects acquired from the artificial intelligence model.

Accordingly, in case an object is an object which becomes a subject of predetermined concentration cooling based on a user command, the processor 140 may provide relatively more cold air in the area wherein the object is located than the other areas inside the refrigerator 100.

Specifically, the refrigerator 100 may include a cold air supply unit (not shown) that performs compression, condensation, and evaporation operations for a refrigerant and forms cold air necessary for cooling of the refrigerating compartment 20 and the freezing compartment 30. In this case, cold air generated by the cold air supply unit (not shown) may be provided to the refrigerating compartment 20 and the freezing compartment 30 through a plurality of discharge openings (not shown) provided on the refrigerating compartment 20 and the freezing compartment 30.

In this case, the processor 140 may determine the location of the object set as the object which becomes a subject of concentration cooling at the refrigerator 100 by using an image photographed through the camera 110, and make relatively more cold air provided to the shelf on which the object which becomes a subject of concentration cooling is located, etc. than the other areas.

For example, the processor 140 may change the direction of cold air provided through the discharge opening (not shown) to the shelf on which the object which becomes a subject of concentration cooling is located, or make the amount of cold air provided at the discharge opening (not shown) providing cold air to the shelf on which the object which becomes a subject of concentration cooling is located greater than the amount of cold air provided at the other discharge openings (not shown) among the plurality of discharge openings (not shown).

Meanwhile, if an event that the door of the refrigerator 100 is opened and then closed occurs, the processor 140 may acquire an image through the camera 110, and in case an object is an object that did not exist in the refrigerator 100 before the occurrence of the event based on the acquired image, the processor 140 may identify whether the object is an object that becomes a subject of concentration cooling.

That is, the processor 140 may compare an image that photographed the inside of the refrigerator 100 acquired through the camera 110 before the door of the refrigerator 100 was opened and an image that photographed the inside of the refrigerator 100 through the camera 110 after the door of the refrigerator 100 was opened and then closed, and determine whether an object that was not included in the former image but is included in the latter image exists.

Then, if it is determined that a new object exists, the processor 140 may determine whether the object is an object that becomes a subject of concentration cooling, and in case the object is an object that becomes a subject of concentration cooling, the processor 140 may perform concentration cooling for the object.

Meanwhile, in performing concentration cooling, the processor 140 may perform concentration cooling based on a mode set for concentration cooling.

Specifically, in case a mode set for concentration cooling is an auto mode, if an object which becomes a subject of concentration cooling is identified, the processor 140 may perform concentration cooling for the object automatically identified even if a separate user command is not input.

Figure 8:
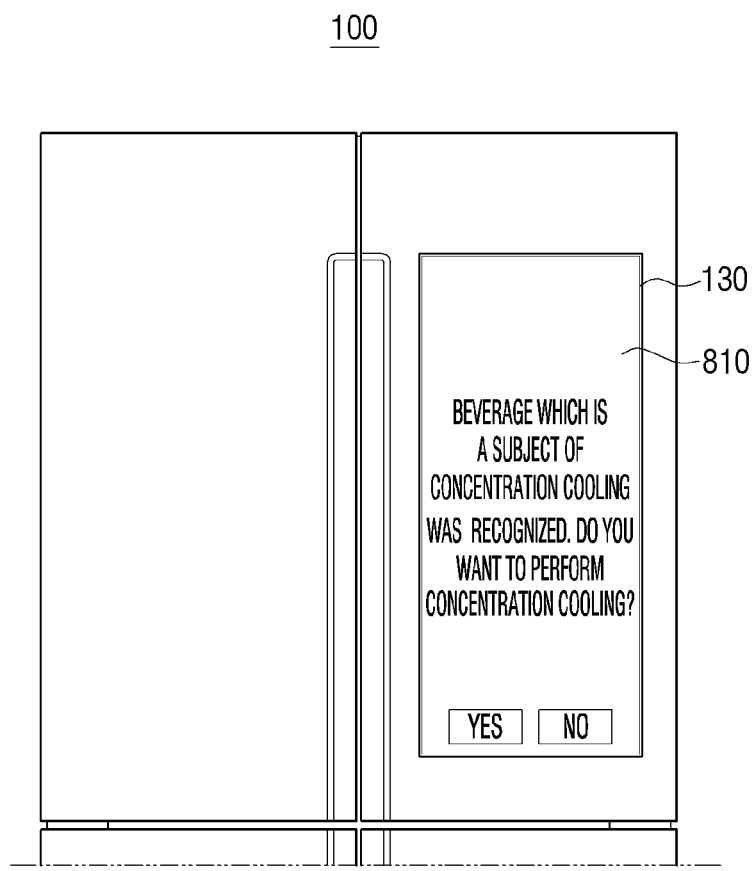
FIG. 8 is a diagram for illustrating a user interface provided when concentration cooling is performed according to an embodiment of the disclosure.

Meanwhile, in case a mode set for concentration cooling is a manual mode, if an object which becomes a subject of concentration cooling is identified, the processor 140 may display a user interface 810 for inquiring whether to perform concentration cooling on the display 130 as in FIG. 8, and if a user command requesting to perform concentration cooling is input through the user interface 810, the processor 140 may perform concentration cooling for the identified object.

As described above, based on a mode set for concentration cooling, in case the mode is an auto mode, the processor 140 may perform concentration cooling for an object automatically identified, and if the mode is a manual mode, if a user command requesting to perform concentration cooling is input, the processor 140 may perform concentration cooling for an identified object.

Meanwhile, after the processor 140 performed concentration cooling, if the temperature of an object that becomes a subject of concentration cooling reaches a predetermined temperature, the processor 140 may stop concentration cooling. Here, a predetermined temperature may be an internal set temperature of the refrigerator 100 set in advance by a user.

Specifically, the processor 140 may identify the temperature inside the refrigerator 100 through a temperature sensor (not shown) provided inside the refrigerator 100, and provide cold air generated by the cold air supply unit (not shown) to the inside of the refrigerator 100 such that the temperature inside the refrigerator 100 becomes an internal set temperature set in advance by a user.

Meanwhile, in case a user opens the door of a refrigerator and puts food, groceries, etc. in the refrigerator and closes the door, the temperature inside the refrigerator may rise due to the temperatures of the products and loss of cold air according to opening and closing of the door.

In this case, if an object added to the inside of the refrigerator 100 is identified as a subject of concentration cooling, the processor 140 may perform concentration cooling for the identified object. In this case, if the temperature of the object which becomes a subject of concentration cooling reaches a predetermined internal set temperature, and also, if the temperature inside the refrigerator 100 reaches a predetermined internal set temperature, the processor 140 may stop concentration cooling for the identified object.

As described above, according to an embodiment of the disclosure, the refrigerator 100 determines whether food, groceries, etc. kept in the refrigerator 100 are subjects of concentration cooling set in advance by a user, and selectively performs concentration cooling in accordance thereto. Thus, the refrigerator 100 can cool food, groceries, etc. that a user wants at a low temperature within a relatively short time period while reducing power consumption.

Meanwhile, the processor 140 may transmit information on each of a plurality of objects kept in the refrigerator 100 to the electronic apparatus 300 through the server 200.

Specifically, the processor 140 may transmit information on each of a plurality of objects existing in the refrigerator 100 and information indicating whether each object is a subject of concentration cooling to the electronic apparatus 300 through the server 200.

For this, the electronic apparatus 300 may include a communication interface (not shown) for performing communication with the server 200, and the processor 140 may transmit information on an image and an object to the server 200 through the communication interface (not shown).

In this case, the electronic apparatus 300 may display information received from the server 200.

Figure 9:
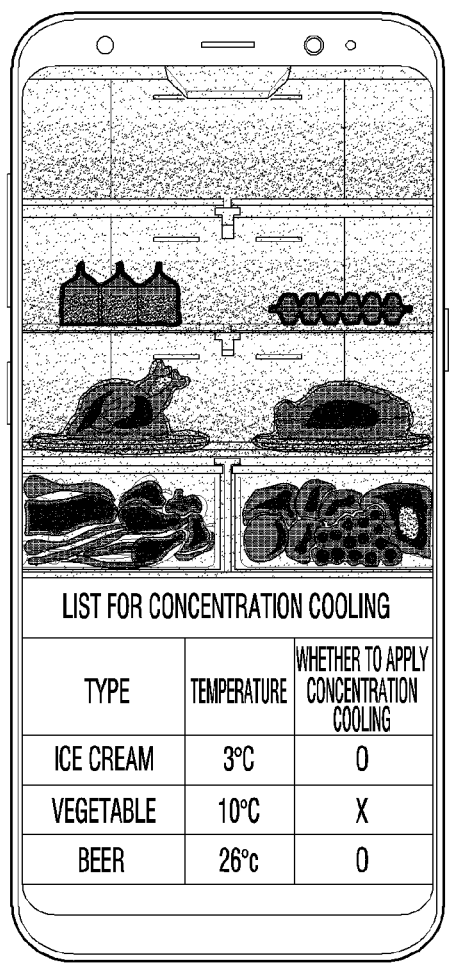
FIG. 9 is a diagram for illustrating a user interface provided at an electronic apparatus according to an embodiment of the disclosure.

For example, as in FIG. 9, the electronic apparatus 300 may display an image received from the server 200, the temperature of the object included in the image, and information indicating whether the object is a subject of concentration cooling on the display of the electronic apparatus 300.

Figure 3B:
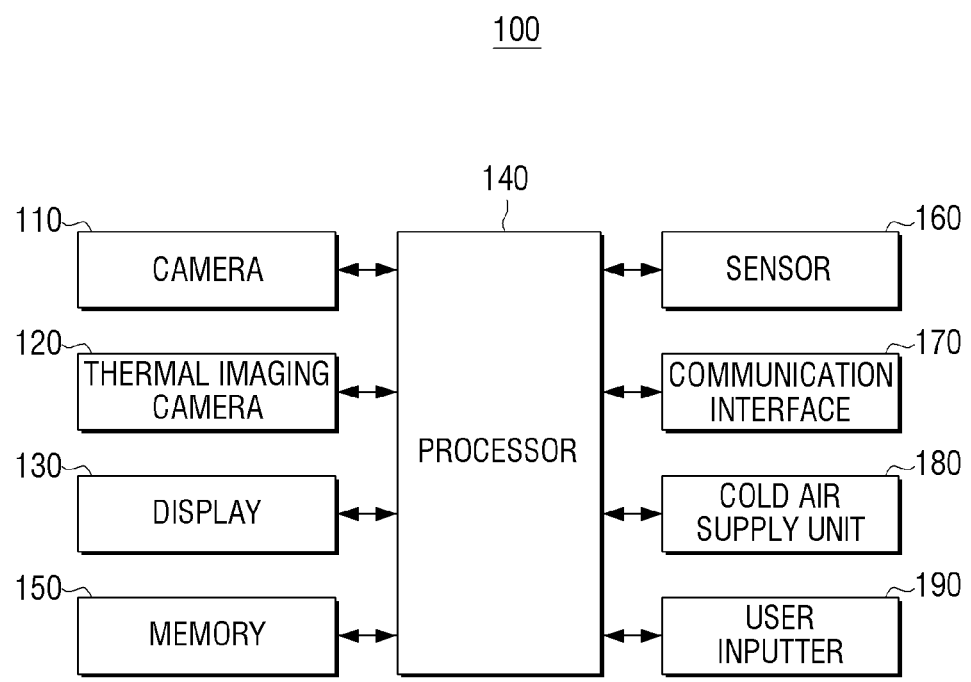
FIG. 3B is a detailed block diagram for illustrating the constitution of a refrigerator according to an embodiment of the disclosure.

FIG. 3B is a block diagram for illustrating the detailed constitution of a refrigerator according to an embodiment of the disclosure.

Referring to FIG. 3B, the refrigerator 100 may include a camera 110, a thermal imaging camera 120, a display 130, a processor 140, a memory 150, a sensor 160, a communication interface 170, a cold air supply unit 180, and a user inputter 190. These components may be controlled by the processor 140.

Meanwhile, the components illustrated in FIG. 3B are merely an example, and at least some components can obviously be omitted depending on embodiments.

Meanwhile, as the camera 110, the thermal imaging camera 120, the display 130, and the processor 140 perform the same functions as in FIG. 3A, overlapping explanation with respect to these components will be omitted.

The memory 150 may store instructions or data related to at least one other component of the refrigerator 100. The memory 150 may be implemented as a non-volatile memory, a volatile memory, a flash-memory, a hard disc drive (HDD), or a solid state drive (SSD), etc. The memory 150 may be accessed by the processor 140, and reading/recording/correction/deletion/update, etc. of data by the processor 140 may be performed. Meanwhile, in the disclosure, the term memory may include a memory 150, a ROM (not shown) inside the processor 140, a RAM (not shown), or a memory card (not shown) (e.g., a micro SD card, a memory stick) installed on the electronic apparatus 100.

Also, in the memory 150, various kinds of data related to the operations of the refrigerator 100 may be stored. For example, in the memory 150, an artificial intelligence model for identifying objects, information on an object set as a subject of concentration cooling, information on the internal set temperature set in the refrigerator 100, etc. may be stored.

The sensor 160 may sense the temperature inside the refrigerator 100. For this, the sensor 160 may include temperature sensors (not shown) for sensing the temperatures of the refrigerating compartment 20 and the freezing compartment 30 in each of the refrigerating compartment 20 and the freezing compartment 30.

Also, the sensor 160 may sense opening and closing of the door of the refrigerator 100. For this, the sensor 160 may include a door detection sensor (not shown) for sensing that the doors of each of the refrigerating compartment 20 and the freezing compartment 30 are opened and then closed.

The communication interface 170 may perform communication with external apparatuses in various types according to communication methods in various types. For this, the communication interface 170 may communicate with external apparatuses through a mobile communication network, a wireless LAN communication network, or a near field communication network. Wireless LAN communication may be connected to an access point (AP) wirelessly in a place wherein an AP is located. For example, wireless LAN communication may include Wi-Fi communication. Meanwhile, near field communication may include Bluetooth communication, Bluetooth low energy communication, Wi-Fi direct, infrared communication (infrared data association, IrDA), ultra-wideband (UWB) communication, magnetic security transmission (MST) communication and/or near field communication (NFC), etc.

The processor 140 may perform communication with the server 200 through the communication interface 170. Specifically, the processor 140 may transmit an image that photographed the inside of the refrigerator 100, the temperatures of a plurality of objects kept in the refrigerator 100, and information on whether each object is a subject of concentration cooling to the server 200 through the communication interface 170. Also, the processor 140 may receive a control command from the server 200 through the communication interface 170.

The cold air supply unit 180 may provide cold air to the inside of the refrigerator 100. For this, the cold air supply unit 180 may include a compressor compressing a refrigerant, a condenser, an expansion valve, an evaporator and a pipe (not shown), a fan, etc.

The user inputter 190 may receive inputs of various user commands, and transmit the input user commands to the processor 140. For this, the user inputter 190 may constitute a touch screen together with the display 130, or include a physical button provided on the front surface of the refrigerator 100. In this case, the processor 140 may control other components to execute various kinds of functions corresponding to user commands input through the user inputter 190.

Figure 10:
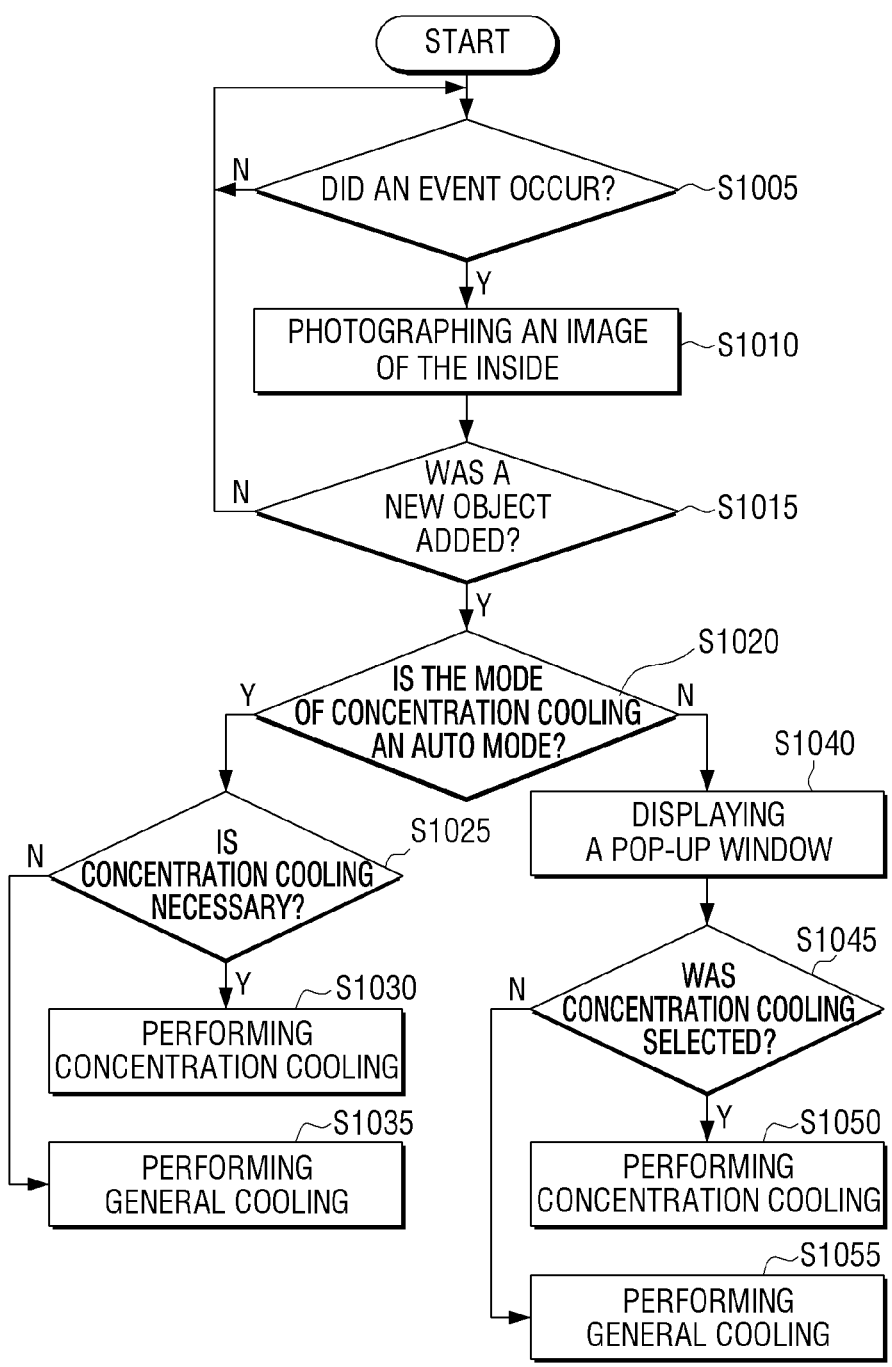
FIG. 10 is a flow chart for illustrating an operation of a refrigerator according to an embodiment of the disclosure.

FIG. 10 is a flow chart for illustrating an operation of a refrigerator according to an embodiment of the disclosure.

Referring to FIG. 10, the processor 140 may identify whether an event occurred at operation S1005. Here, an event may be an event wherein the door of the refrigerator 100 is opened and then closed.

Accordingly, if it is determined that an event that the door of the refrigerator 100 is opened and then closed occurred at operation S1005-Y, the processor 140 may photograph the inside of the refrigerator 100 at operation S1010.

Specifically, the processor 140 may photograph the inside of the refrigerator 100 by using the camera 110 and the thermal imaging camera 120, and receive an image and a thermal image from each of the camera 110 and the thermal imaging camera 120. Then, the processor 140 may store the image photographed through the camera 110 and the thermal image photographed through the thermal imaging camera 120 in the memory 150.

Then, the processor 140 may identify whether a new object was added to the refrigerator 100 by using the image photographed through the camera 110 at operation S1015.

Specifically, the processor 140 may compare an image stored in the memory 150 according to an event that occurred before an event and an image photographed at the camera 110 according to the present event, and determine whether a new object was added to the refrigerator 100.

Then, if it is identified that a new object was added, the processor 140 may determine whether a mode set for concentration cooling is an auto mode at operation S1020.

Accordingly, in case the concentration cooling mode is an auto mode at operation S1020-Y, the processor 140 may identify whether concentration cooling for the newly added object is necessary at operation S1025.

Specifically, the processor 140 may determine the temperature of the newly added object by using a thermal image, and in case the temperature of the object is higher than the internal set temperature of the refrigerator 100, the processor 140 may determine that concentration cooling for the object is necessary.

Accordingly, if it is identified that concentration cooling is necessary for the newly added object at operation S1025-Y, the processor 140 may perform concentration cooling for the object at operation S1030. Specifically, the processor 140 may control the cold air supply unit 180 such that a relatively greater amount of cold air is provided to the shelf on which the newly added object is located.

Meanwhile, if it is identified that concentration cooling is not necessary for the newly added object at operation S1025-N, the processor 140 may perform general cooling at operation S1035. That is, the processor 140 may control the cold air supply unit 180 such that the temperature inside the refrigerator 100 is maintained to be regular to the internal set temperature without separate concentration cooling.

Meanwhile, in case the concentration cooling mode is a manual mode at operation S1020-N, the processor 140 may display a user interface for inquiring whether to perform concentration cooling on the display 130 at operation S1040.

Then, if a user command for concentration cooling is received through the user inputter 190, the processor 140 may perform concentration cooling for an object at operation S1050. Meanwhile, if a user command requesting to not perform concentration cooling is received through the user inputter 190, the processor 140 may perform general cooling at operation S1055.

Meanwhile, if it is identified that a new object has been added, the processor 140 may store the image photographed through the camera 110 and the thermal image photographed through the thermal imaging camera 120 in the memory 150.

Then, the processor 140 may transmit the image photographed through the camera 110 and the thermal image photographed through the thermal imaging camera 120 to the server 200 through the communication interface 170.

Also, the processor 140 may transmit information on an object kept inside the refrigerator 100, i.e., information on the name of the object, information on whether the object is a subject of concentration cooling, and information on the temperature of the object, etc. to the server 200 through the communication interface 170.

In this case, the server 200 may transmit the image received from the refrigerator 100 and information on the object to the electronic apparatus 300, and the electronic apparatus 300 may display the image received from the server 200 and the information on the object on the display (not shown) of the electronic apparatus 300.

Meanwhile, if a user command for displaying the object kept inside the refrigerator 100 is input, the processor 140 may display the image that photographed the inside of the refrigerator 100 on the display 130. Here, the processor 140 may overlap the thermal image of the object on the image and display the image.

Meanwhile, the electronic apparatus 300 may transmit a user command for controlling the refrigerator 100 to the refrigerator 100 through the server 200.

For example, the electronic apparatus 300 may transmit a user command for setting the internal temperature of the refrigerator 100 and a user command for setting a subject of concentration cooling to the refrigerator 100.

In this case, if a user command is received from the server 200 through the communication interface 170, the processor 140 may perform an operation corresponding thereto.

For example, if a user command for setting the internal temperature of the refrigerator 100 is received, the processor 140 may set the internal temperature of the refrigerator 100 as the temperature input according to the user command, and control the cold air supply unit 180 such that the temperature inside the refrigerator 100 is maintained to be regular to a predetermined internal temperature.

As another example, if a user command for setting a subject of concentration cooling is received, the processor 140 may set an object selected according to the user command as the subject of concentration cooling, and in case the object exists in the refrigerator, or is newly added, the processor 140 may perform concentration cooling for the object.

FIG. 11 is a flow chart for illustrating a method of controlling a refrigerator according to an embodiment of the disclosure.

First, an image that photographed the inside of the refrigerator is acquired through the camera, and an object included in the acquired image is identified at operation S1110.

Then, information on the temperature of the identified object is acquired based on a thermal image that photographed the inside of the refrigerator through the thermal imaging camera at operation S1120.

Afterwards, information on the identified object and information on the temperature of the identified object are displayed at operation S1130.

In this case, at the operation S1110, an image acquired through the camera is input into the artificial intelligence model and the object may thereby be identified.

Meanwhile, at the operation S1130, the name of the identified object may be displayed on the image acquired through the camera by using the artificial intelligence model.

Also, at the operation S1130, the image corresponding to the object in the thermal image acquired through the thermal imaging camera may be overlapped on the area corresponding to the object in the image acquired through the camera and the image may be displayed.

Meanwhile, in case the object is an object which becomes a subject of predetermined concentration cooling based on a user command, relatively more cold air may be provided to the area wherein the object is located than the other areas inside the refrigerator.

In this case, if an event that the door of the refrigerator is opened and then closed occurs, an image may be acquired through the camera, and in case the object is an object that did not exist in the refrigerator before the occurrence of the event based on the acquired image, it may be identified that the object is an object that becomes a subject of concentration cooling.

Meanwhile, information on the temperatures of each of a plurality of objects existing in the refrigerator and information indicating whether each of the plurality of objects is a subject of concentration cooling may be transmitted to the electronic apparatus through the server.

Accordingly, a user can figure out the kinds, locations, and temperatures of food, groceries, etc. kept inside the refrigerator just at a glance without opening the door, and accordingly, unnecessary leakage of cold air that is generated by opening of the door can be prevented. Also, as concentration cooling is performed for food, groceries, etc. set as the subjects of concentration, food, groceries, etc. that a user wants can be cooled at a low temperature within a relatively short time period while power consumption is reduced.

According to the various embodiments of the disclosure, a user can figure out the kinds, locations, and temperatures of food, groceries, etc. kept inside a refrigerator just at a glance without opening the door of the refrigerator, and accordingly, unnecessary leakage of cold air that is generated by opening of the door can be prevented. Also, as concentration cooling is performed for food, groceries, etc. set as the subjects of concentration, food, groceries, etc. that a user wants can be cooled at a low temperature within a relatively short time period while power consumption is reduced.

Meanwhile, according to an embodiment of the disclosure, the various embodiments described above may be implemented as software including instructions that are stored in machine-readable storage media, which can be read by machines (e.g.: computers). The machines refer to apparatuses that call instructions stored in a storage medium, and can operate according to the called instructions, and the apparatuses may include the electronic apparatus according to the embodiments described in the disclosure (e.g.: the electronic apparatus A). In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to an embodiment of the disclosure, the method according to the various embodiments described above may be provided while being included in a computer program product. A computer program product refers to a product, and it can be traded between a seller and a buyer. A computer program product can be distributed on-line in the form of a storage medium that is readable by machines (e.g.: a compact disc read only memory (CD-ROM)), or through an application store (e.g.: play store TM). In the case of on-line distribution, at least a portion of a computer program product may be stored in a storage medium such as the server of the manufacturer, the server of the application store, and the memory of the relay server at least temporarily, or may be generated temporarily.

In addition, each of the components according to the aforementioned various embodiments (e.g.: a module or a program) may consist of a singular object or a plurality of objects. Also, among the aforementioned corresponding sub components, some sub components may be omitted, or other sub components may be further included in the various embodiments. Generally or additionally, some components (e.g.: a module or a program) may be integrated as an object, and perform the functions that were performed by each of the components before integration identically or in a similar manner. A module, a program, or operations performed by other components according to the various embodiments may be executed sequentially, in parallel, repetitively, or heuristically. Or, at least some of the operations may be executed in a different order or omitted, or other operations may be added.

Also, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A refrigerator comprising:
    a camera;
    a thermal imaging camera;
    a display; and
    a processor configured to:
        acquire an image that photographed an inside of the refrigerator through the camera, identify an object included in the acquired image, acquire information on a temperature of the identified object based on a thermal image that photographed the inside of the refrigerator through the thermal imaging camera, and control the display to display information on the identified object and information on the temperature of the identified object,
    wherein the processor is configured to:
        based on an event that a door of the refrigerator is opened and closed occurring, acquire an image through the camera,
        based on the acquired image, identify the object that did not exist in the refrigerator before an occurrence of the event as an object that becomes a subject of concentration cooling, and
        provide relatively more cold air in an area wherein the object is located than the other areas inside the refrigerator.

2. The refrigerator of claim 1,
wherein the processor is configured to:
identify the object by inputting an image acquired through the camera into an artificial intelligence model.

3. The refrigerator of claim 2,
wherein the processor is configured to:
identify a name of the object by using the artificial intelligence model, and display information on the name of the object on the image acquired through the camera.

4. The refrigerator of claim 1,
wherein the processor is configured to:
display an area corresponding to the object in the thermal image acquired through the thermal imaging camera by overlapping the area with an area corresponding to the object in the image acquired through the camera.

5. The refrigerator of claim 1, further comprising:
a communication interface for communicating with a server,
wherein the processor is configured to:
control the communication interface to transmit information on temperatures of each of a plurality of objects existing in the refrigerator and information indicating whether each of the plurality of objects is a subject of concentration cooling to an electronic apparatus through the server.

6. A method of controlling a refrigerator, the method comprising:
acquiring an image that photographed an inside of the refrigerator through a camera, and identifying an object included in the acquired image;
acquiring information on a temperature of the identified object based on a thermal image that photographed the inside of the refrigerator through the thermal imaging camera; and
displaying information on the identified object and information on the temperature of the identified object,
wherein the method of controlling the refrigerator further comprises:
based on an event that a door of the refrigerator is opened and closed occurring, acquiring an image through the camera;
based on the acquired image, identifying the object that did not exist in the refrigerator before an occurrence of the event as an object that becomes a subject of concentration cooling; and
providing relatively more cold air in an area wherein the object is located than the other areas inside the refrigerator.

7. The controlling method of claim 6,
wherein the identifying comprises:
identifying the object by inputting an image acquired through the camera into an artificial intelligence model.

8. The controlling method of claim 7,
wherein the displaying comprises:
displaying a name of the object identified by using the artificial intelligence model on the image acquired through the camera.

9. The controlling method of claim 6,
wherein the displaying comprises:
displaying an area corresponding to the object in the thermal image acquired through the thermal imaging camera by overlapping the area with an area corresponding to the object in the image acquired through the camera.

10. The controlling method of claim 6, further comprising:
transmitting information on temperatures of each of a plurality of objects existing in the refrigerator and information indicating whether each of the plurality of objects is a subject of concentration cooling to an electronic apparatus through a server.

* * * * *